(No Model.)
J. M. RICHARDSON.
FARM GATE.
No. 492,698. Patented Feb. 28, 1893.
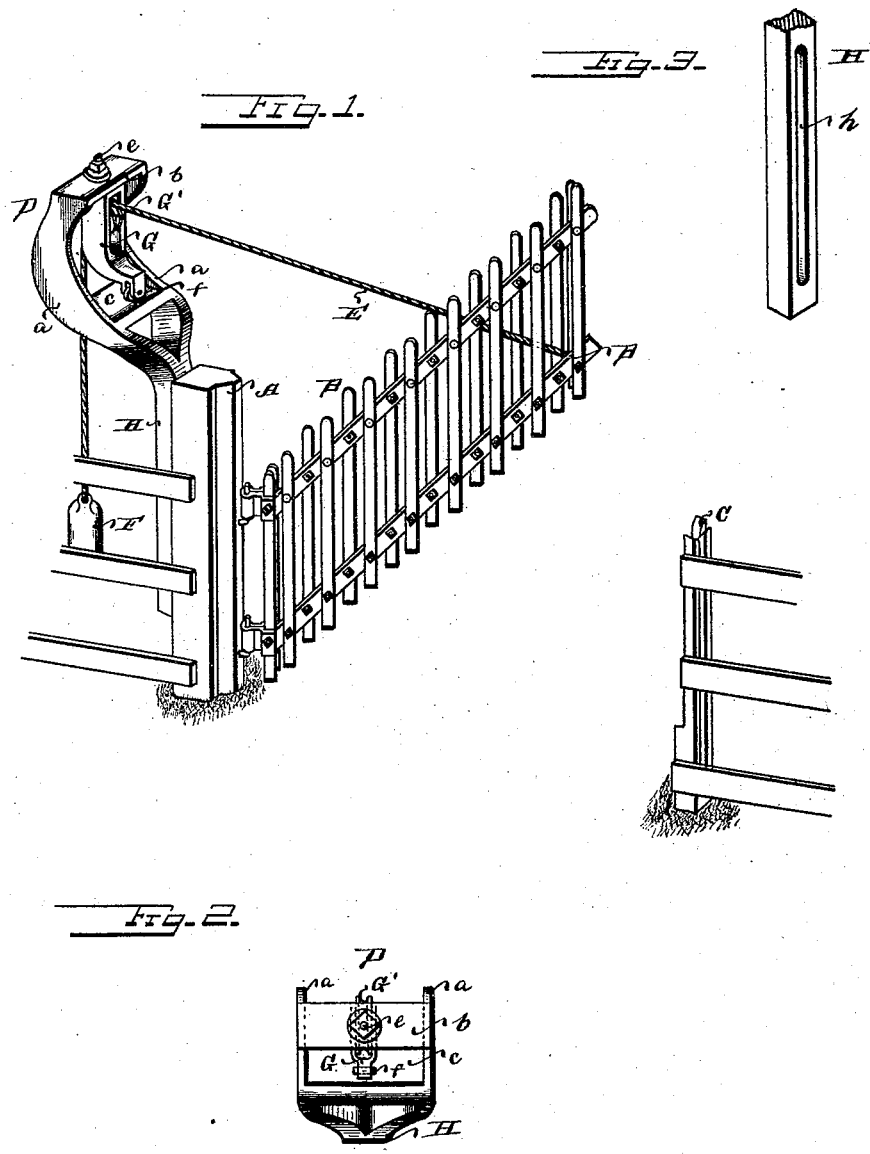
WITNESSES
Jesse Heller
Philip C. Ullasi
INVENTOR
J. M. Richardson
by E. W. Anderson
his Attorney

UNITED STATES PATENT OFFICE.

JOSEPH M. RICHARDSON, OF INDIANAPOLIS, INDIANA.

FARM-GATE.

SPECIFICATION forming part of Letters Patent No. 492,698, dated February 28, 1893.

Application filed October 10, 1892. Serial No. 448,411. (No model.)

*To all whom it may concern:*

Be it known that I, JOSEPH M. RICHARDSON, a citizen of the United States, and a resident of Indianapolis, in the county of Marion and State of Indiana, have invented certain new and useful Improvements in Farm-Gates; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of the gate and latch post. Fig. 2 is a top plan view of the bracket. Fig. 3 is a detail view of the arm H, with the head broken off.

This invention has relation to certain new and useful improvements in counterbalance mechanism for swinging, folding, or flexible gates, such as shown in my patent No.133,057, to which this improvement more especially relates the object being to provide means for the adjustment of the post head or bearing for the connection between the gate and its counterbalance mechanism, in order that such head or bearing may be adapted to any ordinary post, without necessitating an increased height of the latter for the purpose of bringing the weight sufficiently above the fence to prevent its interference therewith in descent.

A further object of the invention is to provide an improved head or bearing, which will provide for the free swivel movement of the bearing pulley, and which will have sufficient strength to sustain the weight of the gate when elevated or swung.

With these objects in view, the invention consists in the novel construction and combination of parts, all as hereinafter specified.

In the accompanying drawings the letter A designates the gate post to which the gate B is hinged, and C is the latch post. The gate B may be of the parallel folding construction shown in Fig. 1, or of the usual swinging form, or of any other suitable style or construction.

D designates the head or bearing for the flexible connection E between the gate and the counterbalancing weight F, said head or bearing comprising a frame or casting, having the curved side arms $a$, $a$, the transverse upper plate $b$, and the transverse lower plate $c$.

G is a small bracket swiveled between the arms $a$, $a$, by means of a pivot stud $e$ at its upper end, having a bearing in the plate $b$, and by a small roller or wheel $f$ at its lower portion, which travels on the lower plate $c$. It will be apparent that the bracket G is capable of a free swivel or turning movement, while the arrangement of the wheel bearing on the plate $c$ causes the said plate to sustain the weight of the gate, without undue friction between the said plate and bracket.

Journaled in the bracket G is the pulley G' for the cord or chain E. The frame or casting D has a downwardly extending arm H, which at its lower portion is secured to the back of the post. The connection between said arm and post may be effected by bolts or screws, and these preferably extend through an elongated slot in the arm H, in order that an adjustment of the latter may be more readily effected.

The advantage of supporting the head or bearing by means of an extension or arm, instead of mounting it directly upon the upper end of the post, will be apparent from the following:—When the head is supported directly upon the upper end of a post in placing the gate in a fence, it is frequently found necessary to set a new post of greatly increased height, in order to support the counterbalancing weight at such a height that as it descends it will not come in contact with the fence. This high post, besides involving additional labor and expense, is frequently objected to. By the use of the arm supporting the head or bearing, this necessity for a higher post is avoided, as the arm is sufficiently long to raise the head above the post to the proper height. Moreover, the same head can be adapted to any post by varying the position at which the arm is connected to the post,—higher or lower as the case may be.

Having described this invention, what I claim, and desire to secure by Letters Patent, is—

1. The combination with a folding, flexible or swinging gate, and its counterbalancing weight, of the head or bearing for the flexible connection between said gate and weight, said head or bearing having its arms united at their lower portions, the united portion of said arms forming an elongated downward extension, and means for adjustably securing said extension to the hinge post of the gate, whereby said head may be adjusted to the proper height above said post without reference to the height of the latter, substantially as specified.

2. In a counterbalanced, folding, flexible, or swinging gate, a head or bearing for the flexible connection between said gate and its counterbalancing weight, said head or bearing comprising the frame or casting, the bracket swiveled in said frame or casting and carrying a pulley, and a wheel or roller in the lower end of said bracket traveling on a transverse portion of said plate or bracket, and a downwardly-extended arm of said frame or casting, having means whereby it may be secured to a hinge post in different adjustments, substantially as specified.

3. The herein described head or bearing for gates, of the character hereinbefore described, said head or bearing comprising a frame or casting, a bracket swiveled in said frame or casting, a pulley carried by said bracket, a wheel or roller journaled in the lower portions of said bracket, a bearing plate upon which said wheel or roller is designed to travel upon the rotation of said bracket, and means for connecting said frame or casting to a gate post, substantially as specified.

In testimony whereof I affix my signature in presence of two witnesses.

JOSEPH M. RICHARDSON.

Witnesses:
PHILIP C. MASI,
JESSE HELLER.